US011763566B2

(12) United States Patent
Lee et al.

(10) Patent No.: US 11,763,566 B2
(45) Date of Patent: Sep. 19, 2023

(54) TARGET ASSOCIATION USING OCCLUSION ANALYSIS, CLUSTERING, OR BOTH

(71) Applicant: ObjectVideo Labs, LLC, Tysons, VA (US)

(72) Inventors: Sung Chun Lee, Tysons, VA (US); Gang Qian, McLean, VA (US); Sima Taheri, McLean, VA (US); Sravanthi Bondugula, Tysons, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 284 days.

(21) Appl. No.: 17/348,047

(22) Filed: Jun. 15, 2021

(65) Prior Publication Data

US 2021/0407107 A1 Dec. 30, 2021

Related U.S. Application Data

(60) Provisional application No. 63/044,442, filed on Jun. 26, 2020.

(51) Int. Cl.
*G06T 7/50* (2017.01)
*G06V 20/52* (2022.01)
(Continued)

(52) U.S. Cl.
CPC ............. *G06V 20/52* (2022.01); *G06F 18/23* (2023.01); *G06T 7/248* (2017.01); *G06T 7/50* (2017.01);
(Continued)

(58) Field of Classification Search
CPC ...... G06V 20/52; G06V 10/255; G06V 10/56; G06V 10/74; G06V 10/762; G06V 40/10;
(Continued)

(56) References Cited

U.S. PATENT DOCUMENTS

2018/0047193 A1* 2/2018 Gao ..................... G06T 7/248
2018/0374233 A1* 12/2018 Zhou ..................... G06F 18/22
(Continued)

OTHER PUBLICATIONS

Ester et al., "A Density-Based Algorithm for Discovering Clusters in Large Spatial Databases with Noise," 2nd International Conference on Knowledge Discovery and Data Mining, Jun. 6, 2010, 6 pages.

(Continued)

*Primary Examiner* — Ali Bayat
(74) *Attorney, Agent, or Firm* — Fish & Richardson P.C.

(57) ABSTRACT

Methods, systems, and apparatus, including computer programs encoded on computer storage media, for tracking moving objects depicted in multiple images. One of the methods includes determining, for an image captured by a camera, a first bounding box that represents a first moving object depicted in the image, determining that the first bounding box and a second bounding box overlap in an overlap area, determining that the first moving object represented by the first bounding box was farther from the camera that captured the image than a second moving object represented by the second bounding box, generating a mask for the first bounding box based on the overlap area, and determining, using data from the image that is associated with the mask, that the first moving object matches an appearance of another moving object depicted in another image captured by the camera.

20 Claims, 5 Drawing Sheets

(51) Int. Cl.
- *G06T 7/246* (2017.01)
- *G06T 7/90* (2017.01)
- *G06V 40/10* (2022.01)
- *G06F 18/23* (2023.01)
- *G06V 10/56* (2022.01)
- *G06V 10/74* (2022.01)
- *G06V 10/762* (2022.01)
- *G06V 10/20* (2022.01)

(52) U.S. Cl.
CPC .............. *G06T 7/90* (2017.01); *G06V 10/255* (2022.01); *G06V 10/56* (2022.01); *G06V 10/74* (2022.01); *G06V 10/762* (2022.01); *G06V 40/10* (2022.01); *G06T 2207/10016* (2013.01); *G06T 2207/30196* (2013.01); *G06T 2207/30232* (2013.01)

(58) Field of Classification Search
CPC . G06F 18/23; G06T 7/248; G06T 7/50; G06T 7/90; G06T 2207/10016; G06T 2207/30196; G06T 2207/30232
USPC .......................................................... 382/103
See application file for complete search history.

(56) References Cited

U.S. PATENT DOCUMENTS

| | | | |
|---|---|---|---|
| 2019/0050629 A1* | 2/2019 | Olgiati | G06T 7/20 |
| 2019/0065833 A1* | 2/2019 | Wang | G06V 20/46 |
| 2019/0130189 A1* | 5/2019 | Zhou | G06V 10/7515 |
| 2019/0130580 A1* | 5/2019 | Chen | G06V 10/82 |
| 2020/0380252 A1* | 12/2020 | Ding | G06T 7/292 |

OTHER PUBLICATIONS

Kalal et al., "Forward-Backward Error: Automatic Detection of Tracking Failures," International Conference on Pattern Recognition, Aug. 23-26, 2010, 4 pages.

Liao et al., "Modeling Pixel Process with Scale Invariant Local Patterns for Background Subtraction in Complex Scenes," Center for Biometrics and Security Research & National Laboratory of Pattern Recognition, Institute of Automation, Chinese Academy of Sciences Machine Vision Group, University of Oulu, Finland, 2010, 6 pages.

Liao et al., "Person Re-identification by Local Maximal Occurrence Representation and Metric Learning," Center for Biometrics and Security Research, National Laboratory of Pattern Recognition, Institute of Automation, Chinese Academy of Sciences, Jun. 7-12, 2015, 2197-2206.

* cited by examiner

TARGET ASSOCIATION USING OCCLUSION ANALYSIS, CLUSTERING, OR BOTH

CROSS-REFERENCE TO RELATED APPLICATION

This application claims the benefit of U.S. Provisional Application No. 63/044,442, filed on Jun. 26, 2020, the contents of which are incorporated by reference herein in its entirety.

BACKGROUND

Properties can be equipped with monitoring systems that include sensors and connected system components. Some residential-based monitoring systems include cameras.

SUMMARY

Techniques are described for tracking moving objects depicted in a video sequence.

A surveillance system, e.g., a doorbell camera surveillance system, can detect and track moving objects depicted in images captured by a camera. The moving objects can be people, animals, or other types of moving objects of interest.

To improve an accuracy of the system, the surveillance system can use one or more processes for target re-identification to account for instances when a moving target is not detected in a frame of a video sequence, reappears in a frame of a video sequence after not being depicted in some prior frames, or was occluded by another object depicted in some of the images of the video sequence. Associating a moving object with a prior detection of the moving object can improve accuracy because the system can use feature data for the object based on the previous analysis, which can increase a likelihood that the system will corrected detect, analyze, or both, the object.

As part of this process, the system can use bounding boxes that represent an area of an image in which a moving object is depict. An object can be moving when its position across multiple images in a video sequence changes even though its position within a single image does not change.

The system can determine, for a bounding box, a mask that represents a position of the object within the bounding box. When multiple bounding boxes for a single image overlap, the system can generate a visible object mask, e.g., a mask that only includes a left or a right side. The system can then use colors for the portion of the bounding box represented by the mask, or the visible object mask, to compare the object with data for previously detected objects. The system can use a result of this comparison to determine whether the depicted object satisfies a threshold likelihood of being a previously detected object or is likely a different object.

As part of the comparison, the system can compare a color histogram for the bounding box, e.g., represented by a feature vector, determined using the mask or the visible object mask, with color histograms for the previously detected objects. When the system includes data for multiple images in which a particular object was detected, the system can cluster data for the different images and use only the data that satisfies a clustering threshold in the comparison.

For instance, the system can determine, for a previously detected object, a color histogram for each image in which the object was detected. The images in which the object was detected can each satisfy a threshold likelihood of depicting the object.

The color histogram can be a representation of the distribution of colors in an image. It can include one or more feature vectors for an object depicted in the image. For example, the system can create, for a particular image, multiple bins of the color histogram. Each bin can represent frequency of colors in a fixed list of color ranges, such as the hue or saturation data for a portion of the object. The system can use a feature vector to represent an object, such that the feature values included in the feature vector, e.g., hue or saturation values, represent color features for the entire portion of the object. A number in a bin can represent a total number of the certain color in the image, in the entire portion of the object, or both.

For each bin, the system can determine color values, such as hue and saturation values or red, green, and blue values. The system can use any appropriate color values, e.g., that represent a color appearance of an object.

The system can compare the respective color histograms for two images that likely depict the previously detected object. The system can determine a distance between two bounding boxes, each for one of the two images, when the distance is based on the color histograms for corresponding masks. For example, the system can generate, for a first bounding box with a first mask, a color histogram that includes five bins. The system can compare the color histogram of five bins for the first mask with corresponding data determined using a second mask for a second bounding box for another image, e.g., with a color histogram with five bins generated using the second mask. The system can determine a distance between the data for the two images using the distance between the two color histograms, e.g., in a multidimensional space.

The system can maintain, in memory, multiple feature vectors for the previously tracked object, each of which were obtained through multiple previous images, e.g., frames in a video sequence. The system can perform a feature clustering process to reduce the number of feature vectors for each object and to filter out outlier feature vectors, if any. For example, during a feature clustering process, the system can group the feature vectors that are closely distanced together given a set of feature vectors. This can create multiple feature vector groups, each of which includes feature vectors that are closer to other feature vectors in the group than feature vectors that are not in the group. Then, the system can select a largest group among the feature vector groups as the feature vectors of the object. The system can identify outlier feature vectors that are not the part of the selected group and can remove the outliers from the given feature vectors for an object.

When the system analyzes data for an object depicted a new image, the system can then compare the data, e.g., the feature vector represented by the color histogram, with data for multiple different images represented by a cluster. The system can repeat this process for multiple clusters, each of which likely represent a different moving object. The system can then determine a cluster that is closest to the data for the object. If the distance between the cluster and the data for the object satisfies a threshold distance, the system can determine that the object is likely the same object that is represented by the cluster, e.g., and that the system is already tracking the object.

When the distance does not satisfy a threshold distance, the system can determine that the object likely was not being tracked previously. The system can begin to track the object, e.g., by creating an identifier for the object, begging to store data for the object to enable creation of a cluster, or both.

In general, one innovative aspect of the subject matter described in this specification can be embodied in methods that include the actions of determining, for the image captured by the camera, a first bounding box that represents a first moving object depicted in the image; determining that the bounding box and another bounding box for the image overlap in an overlap area; determining that the first moving object represented by the first bounding box was farther from the camera that captured the image than the other moving object represented by the other bounding box; generating a mask for the target bounding box based on non-overlapping area from the bounding box that does not include the overlap area; and determining, using data from the image that is associated with the mask, that the first moving object matches an appearance of a moving object depicted in an image previously captured by the camera.

In general, one innovative aspect of the subject matter described in this specification can be embodied in methods that include the actions of maintaining, in memory, historical image data that includes, for each of multiple images in a video sequence, feature data for each of two or more objects depicted in the respective image; determining, for a first object from the two or more objects and using the historical data, first feature data that satisfies a distance threshold with respect to the other feature data for the first object and second feature data that does not satisfy the distance threshold with respect to the other feature data for the first object, the first feature data and the second feature data for the first object; determining, for an image in the video sequence, third feature data for a bounding box that represents an object depicted in the image; determining that a distance between the third feature data and the first feature data satisfies a threshold distance; and in response to determining that the distance between the third feature data and the first feature data satisfies the threshold value, maintaining, in the memory, the historical data that associates the first feature data and the third feature data with the first object.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The subject matter described in this specification can be implemented in various embodiments and may result in one or more of the following advantages. In some implementations, the system performs the clustering analysis, the mask generation with occlusion analysis, or both, on a subset of images in a video sequence reduce an amount of resources used by the system, improve object tracking, or both. For instance, the system can perform the mask generation, the clustering analysis, or both, on every fifth frame in a video sequence. This can reduce a size of the system, enable a more efficient system, e.g., that uses fewer computer resources, or both. In some implementations, a system that uses visible object masks can have an improved accuracy compared to other systems. For instance, a system that uses data for a visible object mask instead of an entire bounding box region can extract colors more accurately from an image. In some implementations, use of a visible object mask when there are multiple objects in front of a camera, some objects of which may be occluded by others, can enable a system to generate a more accurate color histogram model for the occluded object. In some implementations, a system that uses clustering analysis, e.g., clustering-based feature selection, improves track association of an object across images, e.g., frames, in a video sequence by removing noisy appearance features. In some implementations, a system that uses clustering analysis can limit a system memory size used to maintain data for each object target by clustering feature vectors.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
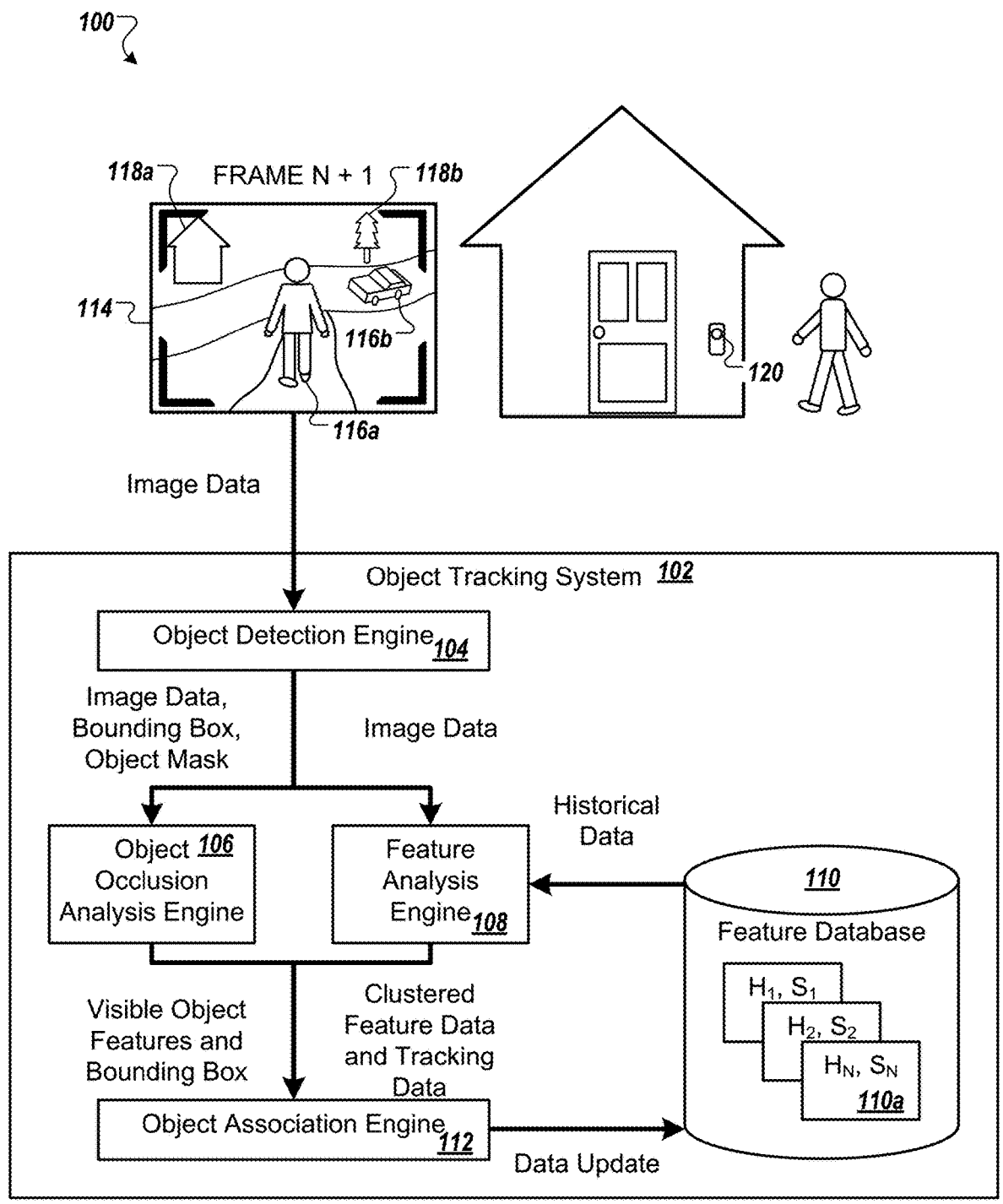
FIG. 1 depicts an example environment with an object tracking system.

FIG. 1 depicts an example environment 100 with an object tracking system 102. The object tracking system 102 analyzes images from a video sequence, e.g., every fifth image captured by a camera, and detects objects depicted in the images. The images in the video sequence can be frames. The object tracking system 102 uses data for the detected objects, e.g., feature vectors, to determine whether an object depicted in one of the images is likely the same object depicted in another image. In some examples, the object tracking system 102 can be implemented on the camera that captures the images in the video sequence that the object tracking system 102 analyzes.

In some implementations, the object tracking system 102 can analyze some of the images in the video sequence different from other images. For instance, the object tracking system 102 can use an object tracking engine to analyze each image in the video sequence. The object tracking engine can use an object mask, e.g., a human shaped mask, to determine feature points for an object depicted in an image. The object tracking engine can use the feature points to track the object as a location of the object changes across images in the video sequence.

To more accurately represent the depiction of an object in an image, increase a likelihood that the object tracking engine associates feature points for the same object with each other across images, or both, the object tracking system 102 can use an object occlusion analysis engine 106, a feature analysis engine 108, or both. For example, the object tracking system 102 can analyze data for a subset of the images in the video sequence using one or both of the object occlusion analysis engine 106 or the feature analysis engine 108. The subset of the images can be every $m^{th}$ image in the video sequence, e.g., based on a first image in the video sequence when the system, or a device on which the system is implemented, begins analyzing the video sequence. In some examples, the $m^{th}$ image can be every fifth image, e.g., when the video sequence includes ten frames per second.

The object tracking system 102 includes an object detection engine 104 that receives images 114 from a camera 120, such as a doorbell camera. In some implementations, the object tracking system 102 is implemented on the hardware for the camera 120. In some examples, the object tracking system 102 is implemented on another device, e.g., a server, that communicates with the camera 120 via a network. The network can be any appropriate type of network.

The object detection engine 104 analyzes the image 114 to determine data for the image 114. The data can include a bounding box, an object mask, or both. For instance, the object detection engine 104 analyzes the image 114 to detect objects depicted in the image 114 that that are not part of a background for images captured by the camera 120, that represent moving objects, other appropriate objects of interest, or a combination of these. In the image 114, the moving objects can be the person 116a and a car 116b. The objects that are part of the background for the image can include a house 118a and a tree 118b.

Although objects that are part of the background can move, e.g., as the tree 118b moves when there is a breeze, the general location of the background objects remains substantially the same. For example, the tree 118b remains in the upper right portion of the image 114 over time, even though the tree 118b may sway because of the wind, grow—and increase in size, or both. In contrast, the person 116a can move toward or away from the camera 120, increasing or decreasing in size respectively. The person 116a can move from the left side of the image 114 to the right side of the image 114.

The object detection engine 104 can generate, for a moving object depicted in the image, a bounding box that defines an area within the image 114 in which the object was depicted. The bounding box can be a smallest area within the image 114 that fully encompasses the object. The object detection engine 104 can use any appropriate process to determine the bounding box. The bounding box can be data that indicates the coordinates of the area with respect to the image, e.g., the lower left corner of the bounding box and dimension data or the upper right corner of the bounding box.

Figure 2:
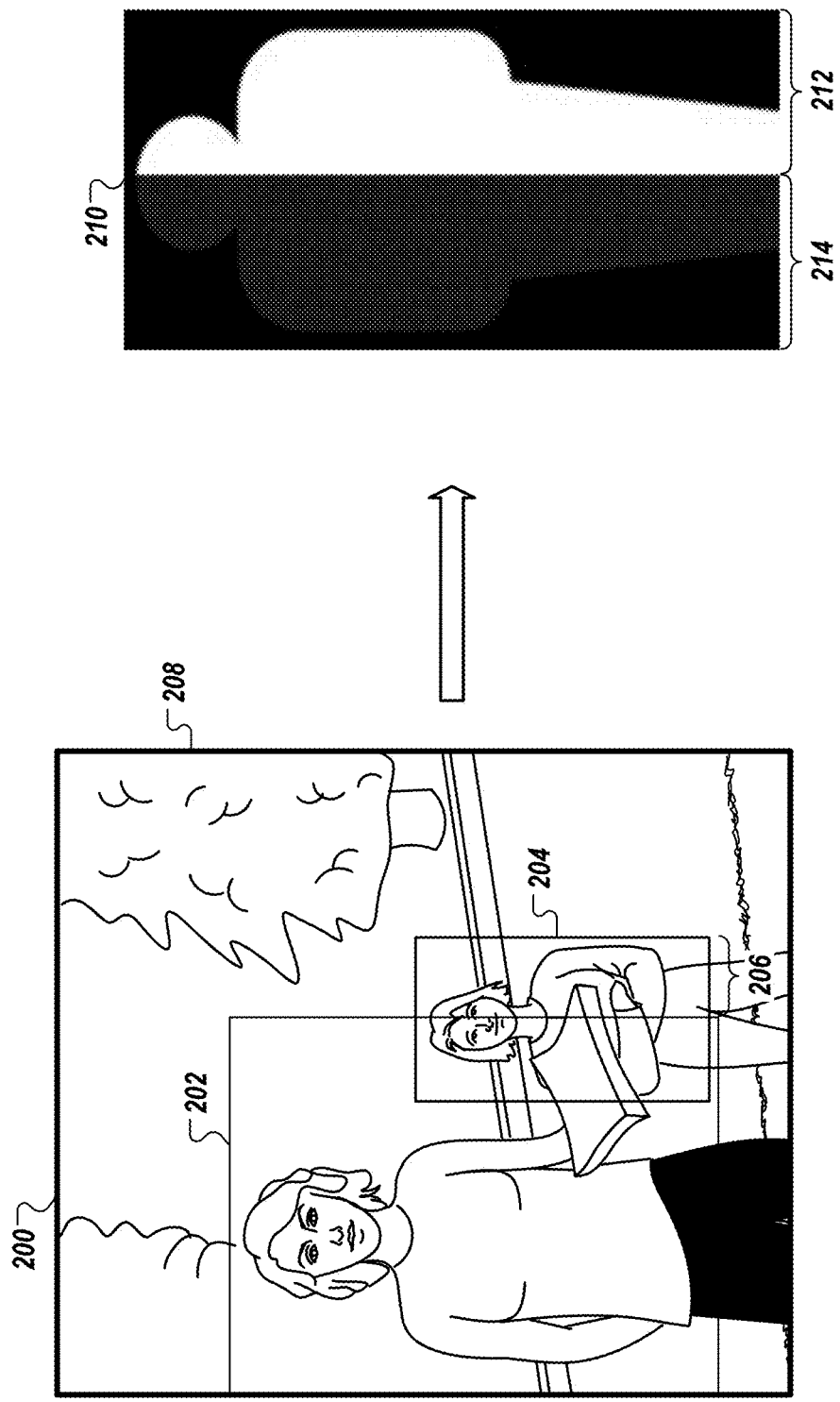
FIG. 2 depicts an example image with bounding boxes.

FIG. 2 depicts an example image 200 with bounding boxes 202, 204. The image 200 can be an example of the image 114. In this example, the object detection engine 104 detected two people, as moving objects, depicted in the image 200. The object detection engine 104 generated the bounding boxes 202, 204 for the two people respectively.

As shown in FIG. 2, the object detection engine 104 does not generate bounding boxes for background objects, such as a tree 208. In some examples, the object detection engine 104 might generate data for background objects. In these examples, the object detection engine 104 would determine that the data for a background object relates to a background object, e.g., using data, such as feature vectors, for background objects represented in images captured by the camera 120. The object detection engine 104 would determine to discard or skip providing data for the background objects to another component in the object tracking system 102.

In some examples, the object detection engine 104 can generate, for a first bounding box 204, an object mask 210. The object detection engine 104 can determine a shape of an object surrounded by the first bounding box 204 and use the shape to generate the object mask 210. For instance, the object detection engine 104 can determine that the object is a person who is facing the camera 120 and select a mask, from a group of predetermined masks, for a person who is facing a camera. The group of predetermined masks can include masks for objects of different types, such as people and dogs, objects with different orientations, such as facing toward a camera that captured the image or a side mask for an object at approximately a 90° angle with respect to the camera, or both.

Returning to FIG. 1, the object detection engine 104 can provide image data, a bounding box, an object mask, or a combination of two or more of these, to the object occlusion analysis engine 106. The object occlusion analysis engine 106 can receive the data and generate a visible object mask.

For example, the object occlusion analysis engine 106 can receive data that represents multiple bounding boxes for the image 114, e.g., the bounding boxes 202 and 204. The object occlusion analysis engine 106 can determine whether the bounding boxes overlap. For instance, returning to FIG. 2, the object occlusion analysis engine 106 can determine an overlap area 206 that represents an area in which the two bounding boxes 202, 204 overlap.

The object occlusion analysis engine 106 uses the non-overlapping area 206 to generate visible object mask 212. The object occlusion analysis engine 106 can generate the visible object mask 212 using the first bounding box 204 and the non-overlapping area 206. For instance, the object occlusion analysis engine 106 can generate the visible object mask 212 using data for an object bounded by the first bounding box 204, e.g., using data that indicates a shape of the object. The object occlusion analysis engine 106 can detect image pixels within the visible object mask using the non-overlapping area 206.

For example, the object tracking system 102 can resize the bounding box 204 to be the same size as the mask 210. The object tracking system 102 can paint the occluded portion 214 of the mask 210 as a black color, which leaves the visible portion 212 of the mask 210 still having the half object, e.g., human, shape as a white color. The object tracking system 102 can put the visible object mask 210 on top of the image 200 such that they overlap. This can cause the visible object mask 210 to align with the bounding box 204, e.g., exactly.

The object tracking system 102 can then apply one or more operations to the image 200 to extract pixels for the object surrounded by the bounding box 204. For instance, the system can apply a pixel-wise AND operation between the mask 210 and the original color image 200 bounding box 204. The pixel-wise AND operation can include two operations: Color Value AND White (1)=the same Color Value; and Color Value AND Black (0)=Black. This operation can generate an image that includes original colors for only the white color area of the visible object mask 212 and a black color area for the remaining portions of the image 200. The system can extract the remaining color pixels. The feature analysis engine 108 can then generate color histogram feature vectors using the extracted color pixels.

In some examples, when the object occlusion analysis engine 106 receives the object mask 210 from the object detection engine 104, the object occlusion analysis engine 106 can remove content from the object mask 210 to generate the visible object mask 212. For instance, the object occlusion analysis engine 106 can determine a portion 214 of the object mask 210 that corresponds to the overlap area 206. The object occlusion analysis engine 106 can remove, from the object mask 210, the portion that corresponds to the overlap area 206 to generate the visible object mask 212.

The object occlusion analysis engine 106 can generate the visible object mask that is a better fit for the object bounded by the first bounding box 204 to enable more accurate tracking of the object. For instance, the first bounding box 204 can bound background content, such as part of a sidewalk and grass. The first bounding box 204 can bound content for another object, such as a package held by another person bounded by the second bounding box 202. By generating a visible object mask 212 for the object bounded by the first bounding box 204, the object tracking system 102 is better able to detect the object in other images in a video sequence, e.g., because the mask includes less data for content other than the object, e.g., person, of interest. For example, use of the visible object mask 212 can enable the object tracking system 102 to more accurately track a visible object of interest across multiple different images in a video sequence.

Returning to FIG. 1, in addition to or separate from the generation of the visible object mask, the feature analysis engine 108 can generate clustered feature data. For instance, the feature analysis engine 108 can receive historical data from a feature database 110. The historical data can include one or more feature vectors 110a that the object tracking system 102 determined were each likely to represent an object depicted in the video sequence. The feature vector can include any appropriate data that represents the object, such as hue H and saturation S data.

For instance, the historical data can include a first feature vector with values $H_1$, $S_1$ for a first image in which the object tracking system 102 detected the object. The historical data can include a second feature vector with values $H_2$, $S_2$ for the object. The historical data can include other feature vectors for the object based on respective images, e.g., include a total of N feature vectors, the last of which includes the values $H_N$, $S_N$. In some examples, the feature vectors are for a subset of the images in a video sequence, e.g., every fifth frame. In these examples, the second feature vector would be for the sixth image in the video sequence, the third feature vector would be for the eleventh image, and so on.

The feature analysis engine 108 analyzes the historical data to determine a cluster of historical data, e.g., feature vectors, to represent the object. The feature analysis engine 108 can use any appropriate process to determine clustered feature data for the object. For instance, the feature analysis engine 108 can use a multi-dimensional space to determine a distance between each of the feature vectors. When the distance between a feature vector and other feature vectors for the object satisfies, e.g., is less than or equal to or either, a threshold distance, the feature analysis engine 108 can include the feature vector in a cluster for the object. The feature analysis engine 108 can use an average distance of the feature vector from the other feature vectors.

The feature analysis engine 108 can create the clustered feature data to generate a more accurate representation of the object. For instance, by creating the clustered feature data that includes feature vectors that are within a threshold distance of each other, the feature analysis engine 108 can use data that is a more accurate representation of the object, not use data that could have been misclassified as representing the object, account for variations in the depiction of the object between images, or a combination of two or more of these. An object can have depiction variations when the sun is directly shining on the object in a first image and not shining on the object in a second image, e.g., because a cloud or another object such as a tree blocked the sun from shining directly on the object.

The feature analysis engine 108 can provide the clustered feature data to an object association engine 112. The object association engine 112 uses the clustered feature data, feature data for an object mask, whether a visible object mask or a whole object mask, to associate an object detected in an image with a cluster of feature data, e.g., associated the object with a previously detected object.

For instance, the object association engine 112 can generate one or more feature vectors for a bounding box that surrounds an object depicted in the image 114, e.g., the N+1th image. The object association engine 112 can compare the feature vectors for the object with the feature vectors in a cluster of feature data. This can include, for a first image represented by the clustered feature data, comparing the first feature vectors for a first bounding box that surrounds the object with second feature vectors for a second bounding box that surrounds an object depicted in the first image. The object association engine 112 can determine, based on this comparison, a distance between the first feature vectors for first bounding box that surrounds the object and the second feature vectors for the second bounding box that surrounds the object depicted in the first image.

The object association engine 112 can repeat this distance determination for each image represented by the clustered feature data. For example, the clustered feature data can include data for a subset of N images that represent an object. The subset of N images can include the first image, the third image, and the Nth image, e.g., when the clustering analysis determined that the second image and any other images between the third image and the Nth image were not closely distanced together, e.g., were farther than a threshold distance from the first, third, and Nth images. In this example, the clustered feature data can include a first feature vector for a first image, e.g., H1, S1, a third feature vector for a third image, e.g., H3, S3, and an Nth feature vector for an Nth image, HN, SN. When the object association engine detects an object in the N+1th image, that has a N+1th feature vector, the object association engine 112 can determine three distances, e.g., when N=3: a first distance between the N+1th feature vector and the first feature vector; a second distance between the N+1th feature vector and the third feature vector, and a third distance between the N+1th feature vector and the Nth feature vector.

The object association engine 112 can then select, from the multiple distances for a cluster of feature data, a shortest distance. For example, the object association engine 112 can compare each of the distances for the cluster of feature data with the other distances to determine the shortest distance.

The object association engine 112 can repeat this process for each of multiple objects. For instance, the object association engine 112 can repeat the process of comparing the N+1th feature vector for an object depicted in the N+1th image with feature vectors in clustered feature data for each of the objects depicted in a prior image, objects detected by the object tracking system 102 within a threshold period of time, or other appropriate objects. The objects depicted in the prior image can be objects depicted in any prior image for which the object tracking system 102 performed the clustering analysis, e.g., when the object tracking system 102 performs the clustering analysis on a subset of the images in a video sequence.

The object association engine 112 can associate the clustered feature data that has the shortest distance between a feature vector in the clustered feature data and the N+1th feature vector. For instance, when the object association engine 112 determines the shortest distance between the N+1th feature vector and each feature vector in a cluster of feature data, the object association engine 112 can select the cluster of feature data that has the shortest distance.

The object association engine 112 can store data for the N+1th feature vector in the feature database 110. The object association engine 112 can associate the N+1th feature vector with the clustered feature data that has the shortest distance, e.g., by storing the N+1th feature vector with the cluster of feature data that has the shortest distance. The object association engine 112 can store data for the N+1th feature vector with an identifier for the clustered feature data that has the shortest distance.

In some implementations, the object association engine 112 can determine whether the shortest distance satisfies a threshold distance. For instance, when the object association engine 112 determines that the shortest distance satisfies the threshold distance, the object association engine 112 can store data for the N+1th feature vector in the feature database 110 that associates the data with the cluster of feature data that has the shortest distance.

When the object association engine 112 determines that the shortest distance does not satisfy the threshold distance, the object association engine 112 can determine to create a new identifier for the N+1th feature vector, a new cluster of feature data for the N+1th feature vector, or both. This can occur when the object association engine 112 determines that the N+1th feature vector likely represents an object that was not previously detected by the object tracking system 102, e.g., within a threshold period of time.

In some examples, the feature analysis engine 108 can receive the image data from the object detection engine 104. In some examples, the feature analysis engine 108 can receive the image data from the camera 120.

The feature analysis engine 108 can determine, for each image in the video sequence that depicts an object, feature points for the object using data from the feature database 110. The data from the feature database can be a feature vector, a tracking box, or both. The feature analysis engine 108 can provide the feature vectors, the tracking box, or both, as tracking data, to the object association engine 112.

The object tracking system 102 is an example of a system implemented as computer programs on one or more computers in one or more locations, in which the systems, components, and techniques described in this document are implemented. The object tracking system 102 may use a single computer, e.g., be implemented on a camera such as a doorbell camera 120, or multiple computers operating in conjunction with one another, including, for example, a set of remote computers deployed as a cloud computing service.

The object tracking system 102 can include several different functional components, including the object detection engine 104, the object occlusion analysis engine 106, the feature analysis engine 108, and the object association engine 112. The object detection engine 104, the object occlusion analysis engine 106, the feature analysis engine 108, the object association engine 112, or a combination of these, can include one or more data processing apparatuses. For instance, each of the object detection engine 104, the object occlusion analysis engine 106, the feature analysis engine 108, and the object association engine 112 can include one or more data processors and instructions that cause the one or more data processors to perform the operations discussed herein.

The various functional components of the object tracking system 102 can be installed on one or more computers as separate functional components or as different modules of a same functional component. For example, the object detection engine 104, the object occlusion analysis engine 106, the feature analysis engine 108, and the object association engine 112 can be implemented as computer programs installed on one or more computers in one or more locations that are coupled to each through a network. In cloud-based systems for example, these components can be implemented by individual computing nodes of a distributed computing system.

Figure 3:
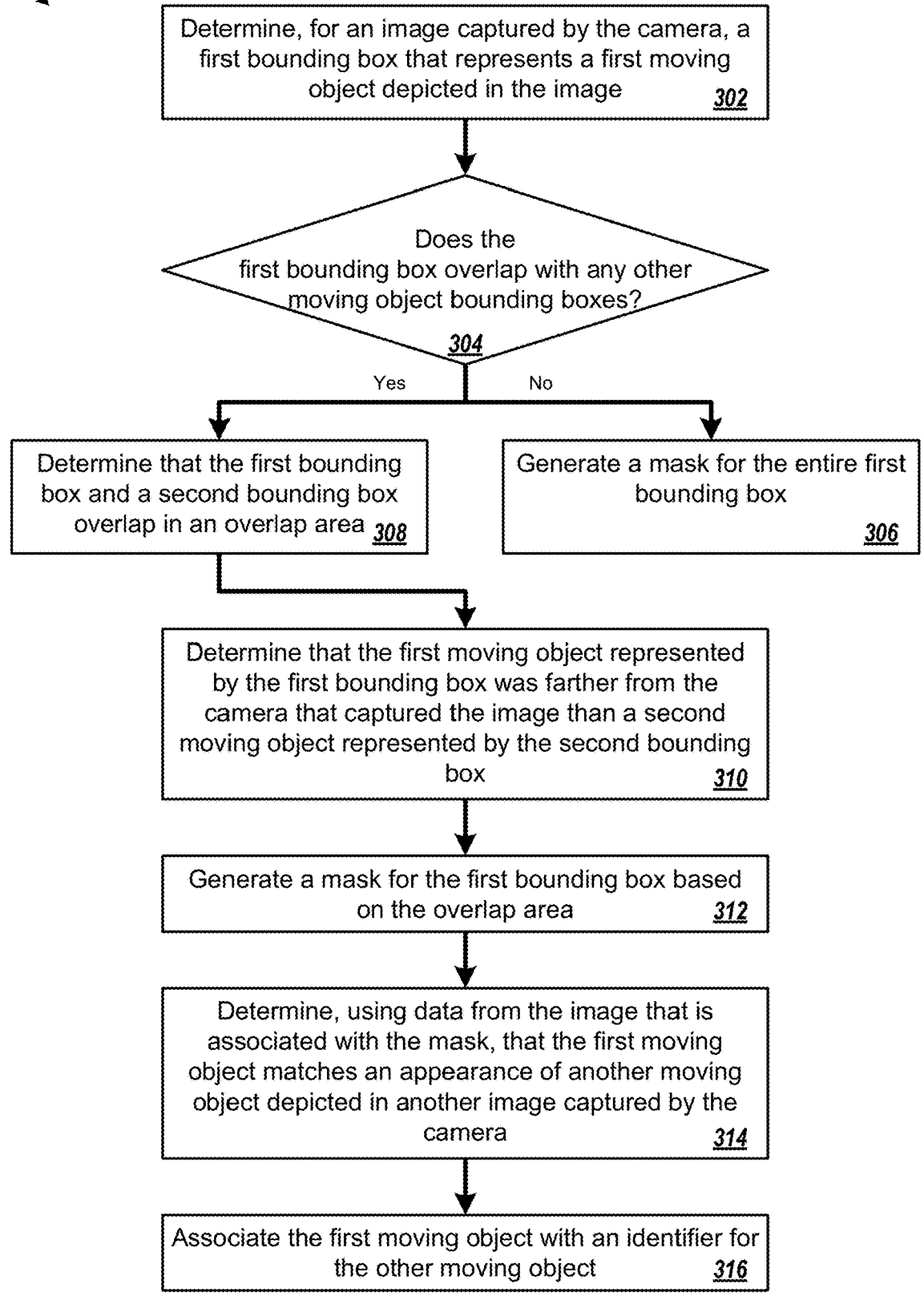
FIG. 3 is a flow diagram of a process for associating data for a partially occluded object with a previously detected object.

FIG. 3 is a flow diagram of a process 300 for associating data for a partially occluded object with a previously detected object. For example, the process 300 can be used by the object tracking system 102 from the environment 100.

An object tracking system determines, for an image captured by the camera, a first bounding box that represents a first moving object depicted in the image (302). The first moving object can be a person, an animal, or another appropriate moving object.

The object tracking system can perform the determination for any appropriate images, e.g., frames, from a video sequence. For example, the object tracking system can perform the determination on every frame, every fifth frame, or every frame based on another period, e.g., every $x^{th}$ frame.

In some implementations, determining, for an image captured by a camera, a first bounding box that represents a first moving object depicted in the image includes determining a smallest rectangle that both includes all pixels in the image that represent the first moving object as the first bounding box and has a top edge and bottom edge that are parallel to a top edge and bottom edge of the image. For example, the object tracking system 102 may generate a bounding box that has a top horizontal edge that is right above a head of a person, a bottom horizontal edge that is right below the feet of the person, a left vertical edge that is next to a left hand of the person, and a right vertical edge that is next to a right hand of the person.

The object tracking system determines whether the first bounding box overlap with any other moving object bounding boxes (304). The object tracking system can analyze the boundaries of the bounding boxes, the content surrounded by the bounding boxes, or other appropriate data to determine whether the first bounding box overlaps with another bounding box.

In response to determining that the first bounding box does not overlap with any other moving object bounding boxes, the object tracking system generates a mask for the entire first bounding box (306). For example, the object tracking system determines that an object surrounded by the bounding box is not occluded and to generate a mask for the entire object.

In response to determining that the first bounding box overlaps with another moving object bounding boxes, the object tracking system determines that the first bounding box and a second bounding box overlap in an overlap area (308). For instance, the object tracking system determines the portions of the bounding boxes that overlap.

In some examples, the object tracking system can determine an overlap area that is larger than an actual overlap between the two bounding boxes. For instance, when a top right corner of the second bounding box overlaps a lower left corner of the first bounding box, the object tracking system can determine a horizontal region, or a vertical region, that represents the overlap area.

The object tracking system determines that the first moving object represented by the first bounding box was farther from the camera that captured the image than a second moving object represented by the second bounding box (310). For example, the object tracking system may determine that the first moving object is farther from the camera that captured the image than a second moving object based on determining that the first bounding box is larger than the second bounding box.

In some implementations, determining that the first moving object represented by the first bounding box was farther from the camera that captured the image than the other moving object represented by the other bounding box includes determining that a bottom of the first bounding box is higher than a bottom of the second bounding box. In some implementations, determining that a bottom of the first bounding box is higher than a bottom of the second bounding box includes determining that a maximum y axis coordinate of the first bounding box is less than a maximum y axis coordinate of the second bounding box where an origin for a y axis is at a top of the image. For example, the object tracking system can determine which moving object was likely closer to the camera based on foot locations for the bounding boxes, e.g., maximum y axis coordinates for the bounding boxes when an origin for the y axis is at the top of the image. When an origin for the y axis is at the bottom of the image, the object tracking system can use minimum y axis coordinates for the bounding boxes. In some examples, a higher y value can indicate that an object is closer to the camera.

When an image depicts multiple objects, the system can determine that an object that is closer to the camera is likely occluding the other objects depicted in the image. The system can determine that, if y values of two bounding boxes are same, the two objects are likely standing side-by-side. In this situation, the system might not remove the overlapping area from the whole mask.

The object tracking system generates a mask for the first bounding box based on the overlap area (312). The mask can be a visible object mask, e.g., for an object that is occluded by the other objects. In some implementations, generating a mask for the first bounding box based on the overlap area includes selecting a predetermined mask and generating the mask by removal of the overlap area from the predetermined mask. For example, the object tracking system can generate a mask for the first bounding box by selecting a mask from a group of predetermined masks and removing the overlap area from the selected mask.

In some implementations, generating a mask for the first bounding box based on the overlap area includes generating the mask from a shape of the first moving object that is not in the overlap area. For example, the object tracking system can generate a mask using a shape of the object surrounded by the bounding box after removal of any content from the object that is included in the overlap area. In some examples, generating a mask for the first bounding box based on the overlap area creates a smaller mask than if the mask were generated using the bounding box alone, e.g., as in step 306.

The object tracking system determines, using data from the image that is associated with the mask, that the first moving object matches an appearance of another moving object depicted in another image captured by the camera (314). The other image can be captured before or after the image, e.g., by the same camera.

In some implementations, determining, using data from the image that is associated with the mask, that the first moving object matches an appearance of another moving object depicted in another image captured by the camera includes determining that a portion of the another image that corresponds to the mask matches a portion of the image that corresponds to the mask. For example, the object tracking system may determine that a portion of the another image that is in the shape of the visible object mask 212 matches a portion of the image that is in the shape of the visible object mask 212.

The object tracking system can compare data for different images using any appropriate process. In some implementations, determining that a portion of the another image that corresponds to the mask matches a portion of the image that corresponds to the mask includes determining that a color histogram for the portion of the another image that corresponds to the mask matches a color histogram of the portion of the image that corresponds to the mask. For example, the object tracking system can compare color histogram features for the two portions of the images shaped like the visible object mask 212 to determine a distance between the two portions. The object tracking system can use one or more steps in the process 400 described below with reference to FIG. 4 to associate data for an object with a previously detected object using clustering.

The object tracking system associates the first moving object with an identifier for the other moving object (316). For example, the object tracking system can store data for the first moving object in a database, e.g., a feature database, in an entry that has an identifier for the other moving object, that includes data for the other moving object, e.g., feature data, or both.

The order of steps in the process 300 described above is illustrative only, and associating data for the object with the previously detected object can be performed in different orders. For example, the object tracking system can determine which moving object was likely closer to the camera, e.g., step 310, prior to determining the overlap area, e.g., step 308.

In some implementations, the process 300 can include additional steps, fewer steps, or some of the steps can be divided into multiple steps. For example, the object tracking system can determine, for an image captured by a camera, the second bounding box that represents the second moving object depicted in the image. The object tracking system can determine second object shaped mask for the second bounding box. The object tracking system can determine the first object shaped mask for the first bounding box such that a portion of the first object mask including at least part of the non-overlapping area. The object tracking system can then determine a visible object mask using the first object shaped mask and the overlap area.

Figure 4:
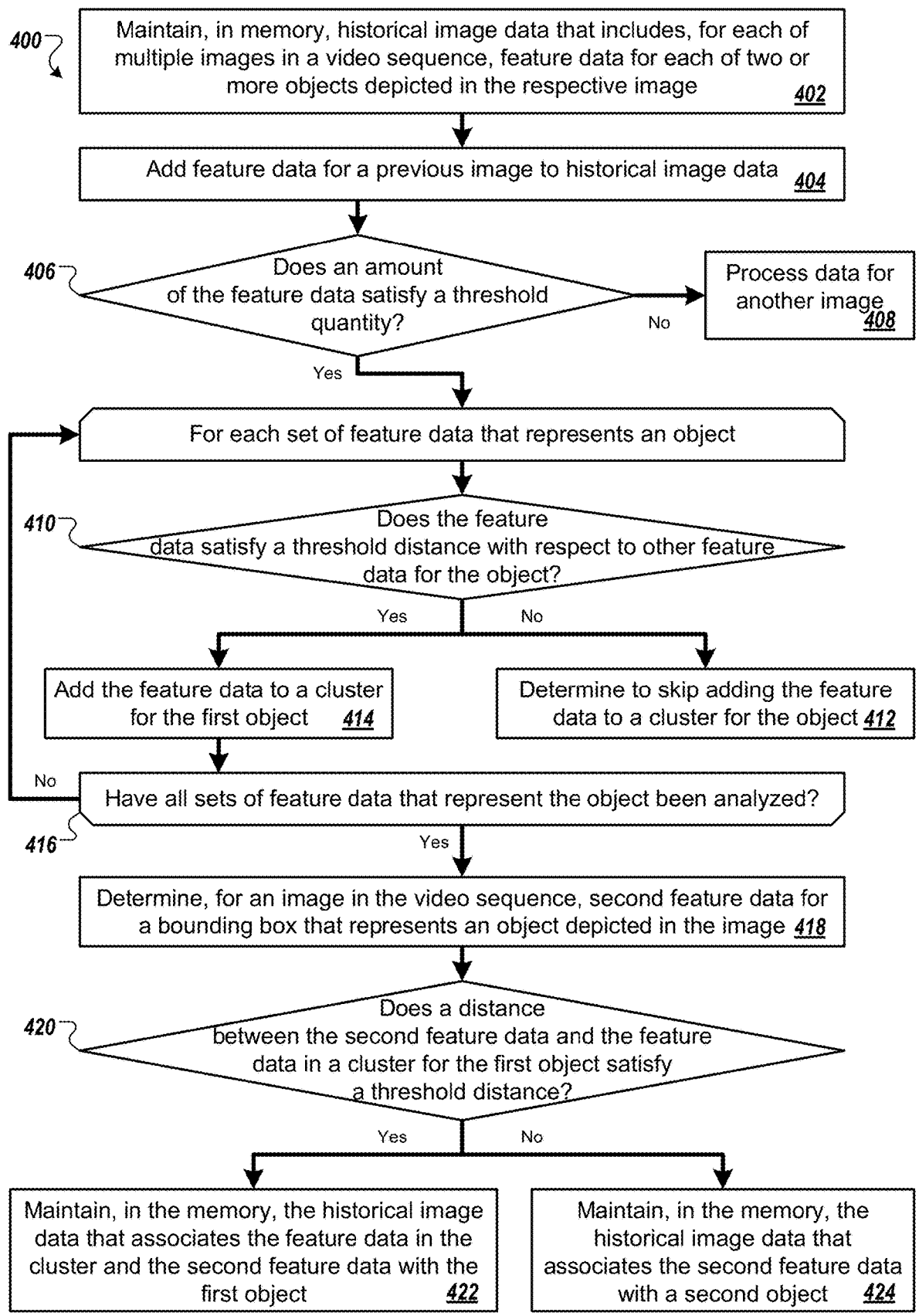
FIG. 4 is a flow diagram of a process for associating data for an object with a previously detected object using clustering.

FIG. 4 is a flow diagram of a process 400 for associating data for an object with a previously detected object using clustering. For example, the process 400 can be used by the object tracking system 102 from the environment 100.

An object tracking system maintains, in memory, historical image data that includes, for each of multiple images in a video sequence, feature data for each of two or more objects depicted in the respective image (402). The feature data can include a feature vector, e.g., one feature vector for each image for which the historical image data includes data for an object. The feature vector can include hue and saturation data for a bounding box. In some examples, a single bounding box can be associated with multiple feature vectors. The feature data for an object can be associated with the same digital identifier for the object.

Add feature data for a previous image to historical data (404). For instance, the object tracking system receives data for a previous image and adds the data to the historical image data.

Determines whether an amount of the feature data satisfies a threshold quantity (406). The object tracking system can determine whether the feature data includes at least the threshold quantity of data. The threshold quantity can indicate a minimum quantity of data for comparison with feature data from other images.

In response to determining that the amount of the feature data does not satisfy the threshold quantity, the object tracking system processes data for another image (408). For example, the object tracking system can perform steps 404 and 406 for a new image.

In response to determining that the amount of the feature data satisfies the threshold quantity, the object tracking system determines, for each set of feature data that represents an object, whether the feature data satisfies a threshold distance with respect to other feature data for the object (410). For example, an object can be associated with multiple sets of feature data, e.g., multiple feature vectors. The sets of feature data can include color histograms, e.g., that each include multiple feature vectors. The object tracking system can perform a clustering process using the feature data to determine first sets of feature data that are close to other sets of feature data for an object and second sets of feature data that are not close to the other sets of feature data for an object, e.g., outlier feature data.

In response to determining that the feature data does not satisfy the threshold distance with respect to other feature data for the object, the object tracking system determines to skip adding the feature data to a cluster for the object (412). For example, the object tracking system deletes, discards, or does not add the feature data to the cluster. The object tracking system can delete the feature data from a database, e.g., the historical image data such as a feature database.

In response to determining that the feature data satisfies the threshold distance with respect to other feature data for the object, the object tracking system adds the feature data to a cluster for the first object (414). For instance, the object tracking system creates an entry in the database that includes all feature data for the cluster, associates the feature data with an identifier for the cluster, or performs another appropriate process to add the feature data to the cluster.

The object tracking system determines whether all sets of feature data that represent the object been analyzed (416). In response to determining that fewer than all sets of feature data that represent the object have been analyzed, the object tracking system analyzes another set of feature data that represents the object, e.g., performs step 410.

The object tracking system determines, for an image in the video sequence, second feature data for a bounding box that represents an object depicted in the image (418). The object tracking system can determine the second feature data in response to determining that all sets of feature data that represent an object have been analyzes, concurrently with the analysis of feature data for an object, or prior to the analysis of feature data for an object, e.g., step 410.

The image can be any appropriate image in the video sequence. The image in the video sequence can be one of the multiple images in the video sequence. The image can be an image that is not included in the multiple images in the video sequence.

The object tracking system determines whether a distance between the second feature data and the feature data in a cluster for the first object satisfies a threshold distance (420). For instance, the object tracking system can use a feature vector, a color histogram, or both, to determine a distance between the second feature data and the feature data. The object tracking system can use any appropriate process to determine a distance between the two sets of feature data, e.g., a vector distance process.

In some examples, the threshold distance indicates whether feature data satisfies a threshold likelihood of representing the same object. In some implementations, the threshold distance indicates that the second feature data is closer to the feature data for a first object than other feature data for other objects. For instance, the historical image data can include feature data for multiple different objects. The object tracking system can determine a distance between the second feature data and each of multiple clusters, when each of the clusters has feature data for one of the multiple different objects. The object tracking system can then determine the feature data that has the shortest distance between the feature data and the second feature data for the object depicted in the image.

In response to determining that the distance between the second feature data and the feature data in the cluster for the first object satisfies the threshold distance, the object tracking system maintains, in the memory, the historical image data that associates the feature data in the cluster and the second feature data with the first object (422). For instance, when the object tracking system previously stored the second feature data in the historical image data, the object tracking system determines to skip deleting the second feature data from the historical image data. The object tracking system can associate the second feature data with the first object by adding an identifier for the first object to an entry in the historical image data that includes the second feature data. The object tracking system can store the second feature data in an entry that includes the feature data for the first object. The object tracking system can use the second feature data for later tracking of the first object, e.g., in subsequence images in the video sequence.

In some implementations, the threshold distance can be a threshold based on other objects depicted in the image in the video sequence. For instance, the object tracking system can determine that when an image depicts four objects, and the historical image data includes data for three objects, the three objects that have the shortest distances between their corresponding second feature data and feature data for the three objects each satisfy the threshold distance while the fourth object that has longer distances between its second feature data and the feature data for the three objects does not satisfy the threshold distance.

In response to determining that the distance between the second feature data and the feature data in the cluster for the first object does not satisfy the threshold distance, the object tracking system maintains, in the memory, the historical image data that associates the second feature data with a second object (424). For example, the historical image data can include data for three objects, e.g., three object trajectories. The object tracking system can determine that an image depicts four objects, e.g., includes data for four trajectories. The object tracking system can determine that three of the objects satisfy threshold likelihoods of representing the same object as one of the three objects for which the historical image data stores feature data.

The object tracking system can determine that the fourth object does not satisfy a threshold likelihood of representing the same object as any of the three objects for which the historical image data stores feature data. The object tracking system can determine that the fourth object likely represents a newly detected object. The object tracking system can generate a new identifier for the newly detected object, e.g., the new trajectory.

The order of steps in the process 400 described above is illustrative only, and associating data for the object with the previously detected object can be performed in different orders. For example, the object tracking system can determine the second feature data and then determine whether feature data stored in the historical image data satisfies the threshold distance.

In some implementations, the process 400 can include additional steps, fewer steps, or some of the steps can be divided into multiple steps. For example, the object tracking system can perform steps 410, 412, and 414 without performing the other steps in the process 400. The object tracking system can perform steps 410 through 422 without performing the other steps in the process 400.

Figure 5:
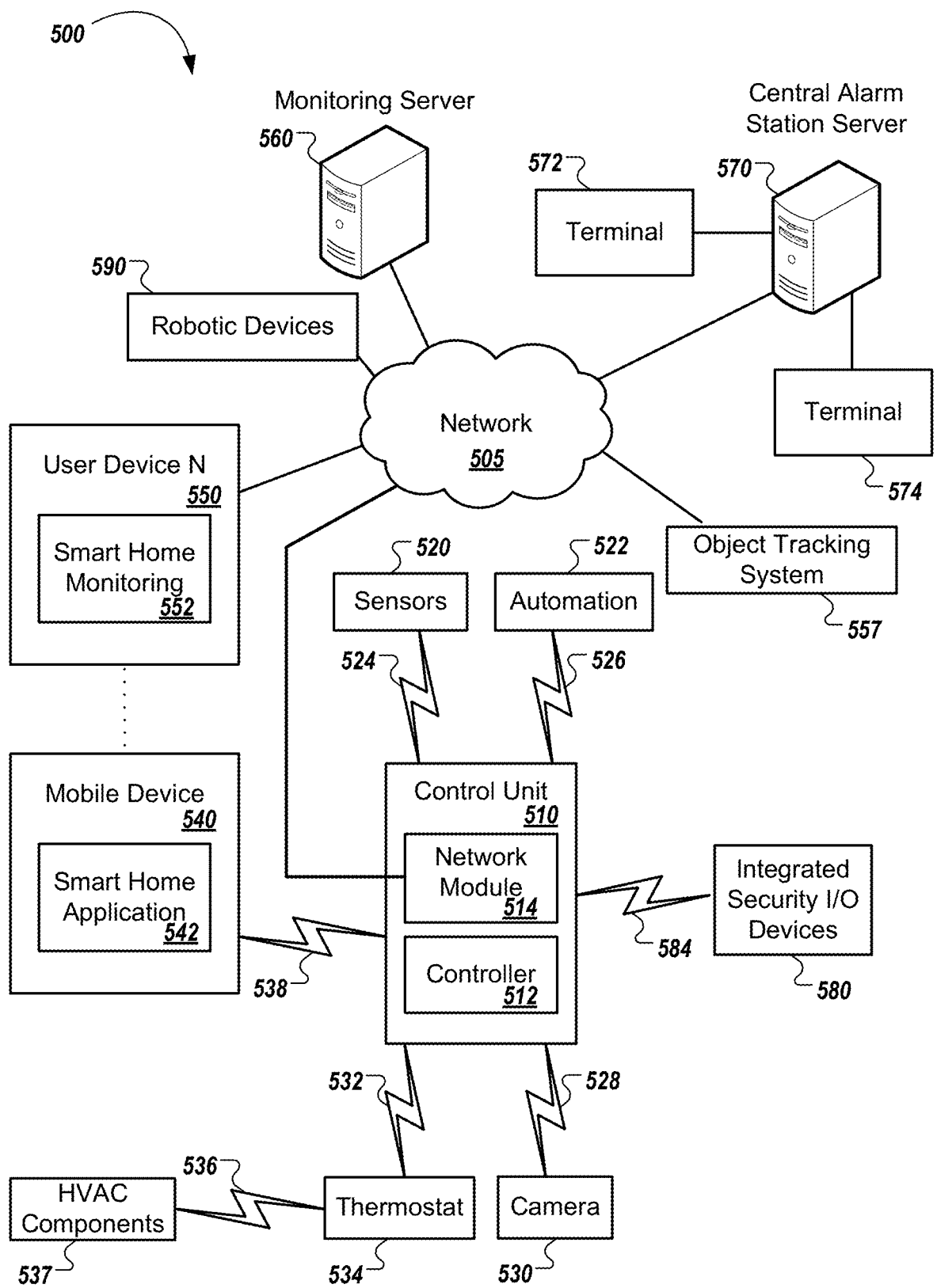
FIG. 5 is a diagram illustrating an example of a home monitoring system.

FIG. 5 is a diagram illustrating an example of a home monitoring system 500. The home monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system 500 may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data. The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. Also, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area or video images of the area in which multiple images of the area are captured at a relatively high frequency (e.g., thirty images per second) or both. The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries, e.g., if located remotely from the control unit 510. The camera 530 may employ a small solar cell to recharge the battery when light is available. The camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 includes object tracking system 557. The object tracking system 557 can be computing devices (e.g., a computer, microcontroller, FPGA, ASIC, or other device capable of electronic computation) capable of receiving data related to the object tracking system and communicating electronically with the monitoring system control unit 510.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 590 may be robotic devices 590 that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zig-Bee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid-state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the home monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the home monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

Also, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events (e.g., alarm events) generated by the control unit 510. In this example, the monitoring server 560 may exchange electronic communications with the network module 514 included in the control unit 510 to receive information regarding events (e.g., alerts) detected by the control unit 510. The monitoring server 560 also may receive information regarding events (e.g., alerts) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system 500 and perform analysis of sensor and image data received from the monitoring system 500. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring server 560 and/or the control unit 510 over the network 505. The user device 550 may be configured to display a smart home user interface 552 that is generated by the user device 550 or generated by the monitoring server 560. For example, the user device 550 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, ZigBee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, the robotic devices 590, and the object tracking system 557. The one or more user devices 540 and 550 receive data directly from the sensors 520, the home automation controls 522, the camera 530, the robotic devices 590, and the object tracking system 557 and sends data directly to the sensors 520, the home automation controls 522, the camera 530, the robotic devices 590, and the object tracking system 557. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, the robotic devices 590, and the object tracking system 557 are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, the robotic devices 590, and the object tracking system 557 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, the robotic devices 590, and the object tracking system 557 to a pathway over network 505 when the one or more user devices 540 and 550 are farther from the sensors 520, the home automation controls 522, the camera 530, the thermostat 534, the robotic devices 590, and the object tracking system 557. In some examples, the system leverages GPS information from the one or more user devices 540 and 550 to determine whether the one or more user devices 540 and 550 are close enough to the sensors 520, the home automation controls 522, the camera 530, the thermostat 534, the robotic devices 590, and the object tracking system 557 to use the direct local pathway or whether the one or more user devices 540 and 550 are far enough from the sensors 520, the home automation controls 522, the camera 530, the thermostat 534, the robotic devices 590, and the object tracking system 557 that the pathway over network 505 is required. In other examples, the system leverages status communications (e.g., pinging) between the one or more user devices 540 and 550 and the sensors 520, the home automation controls 522, the camera 530, the thermostat 534, the robotic devices 590, and the object tracking system 557 to determine whether communication using the direct local pathway is possible. If communication using the direct local pathway is possible, the one or more user devices 540 and 550 communicate with the sensors 520, the home automation controls 522, the camera 530, the thermostat 534, the robotic devices 590, and the object tracking system 557 using the direct local pathway. If communication using the direct local pathway is not possible, the one or more user devices 540 and 550 communicate with the sensors 520, the home automation controls 522, the camera 530, the thermostat 534, the robotic devices 590, and the object tracking system 557 using the pathway over network 505.

In some implementations, the system 500 provides end users with access to images captured by the camera 530 to aid in decision-making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system 500 and other events sensed by the monitoring system 500 may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claims is:

1. A computer-implemented method, comprising:
   determining, for an image captured by a camera, a first bounding box that represents a first moving object depicted in the image;
   determining that the first bounding box and a second bounding box overlap in an overlap area;
   determining that the first moving object represented by the first bounding box was farther from the camera that captured the image than a second moving object represented by the second bounding box;
   generating a mask for the first bounding box based on the overlap area; and
   determining, using data from the image that is associated with the mask, that the first moving object matches an appearance of another moving object depicted in another image captured by the camera.

2. The method of claim 1, wherein determining that the first moving object represented by the first bounding box was farther from the camera that captured the image than the other moving object represented by the other bounding box comprises:
   determining that a bottom of the first bounding box is higher than a bottom of the second bounding box.

3. The method of claim 2, wherein determining that a bottom of the first bounding box is higher than a bottom of the second bounding box comprises:

determining that a maximum y axis coordinate of the first bounding box is less than a maximum y axis coordinate of the second bounding box where an origin for a y axis is at a top of the image.

4. The method of claim 1, wherein determining, for an image captured by a camera, a first bounding box that represents a first moving object depicted in the image comprises:
determining a smallest rectangle that both includes all pixels in the image that represent the first moving object as the first bounding box and has a top edge and bottom edge that are parallel to a top edge and bottom edge of the image.

5. The method of claim 1, wherein generating a mask for the first bounding box based on the overlap area comprises:
selecting a predetermined mask; and
generating the mask by removal of the overlap area from the predetermined mask.

6. The method of claim 1, wherein generating a mask for the first bounding box based on the overlap area comprises:
generating the mask from a shape of the first moving object that is not in the overlap area.

7. The method of claim 1, wherein determining, using data from the image that is associated with the mask, that the first moving object matches an appearance of another moving object depicted in another image captured by the camera comprises:
determining that a portion of the another image that corresponds to the mask matches a portion of the image that corresponds to the mask.

8. The method of claim 1, wherein determining that a portion of the another image that corresponds to the mask matches a portion of the image that corresponds to the mask comprises:
determining that a color histogram for the portion of the another image that corresponds to the mask matches a color histogram of the portion of the image that corresponds to the mask.

9. The method of claim 1, wherein determining that the first bounding box and a second bounding box overlap in an overlap area comprises:
determining that the first bounding box and the second bounding box both include the overlap area.

10. The method of claim 1, wherein the first moving object comprises a person.

11. A system comprising:
one or more computers and one or more storage devices storing instructions that are operable, when executed by the one or more computers, to cause the one or more computers to perform operations comprising:
determining, for an image captured by a camera, a first bounding box that represents a first moving object depicted in the image;
determining that the first bounding box and a second bounding box overlap in an overlap area;
determining that the first moving object represented by the first bounding box was farther from the camera that captured the image than a second moving object represented by the second bounding box;
generating a mask for the first bounding box based on the overlap area; and
determining, using data from the image that is associated with the mask, that the first moving object matches an appearance of another moving object depicted in another image captured by the camera.

12. The system of claim 11, wherein determining that the first moving object represented by the first bounding box was farther from the camera that captured the image than the other moving object represented by the other bounding box comprises:
determining that a bottom of the first bounding box is higher than a bottom of the second bounding box.

13. The system of claim 12 wherein determining that a bottom of the first bounding box is higher than a bottom of the second bounding box comprises:
determining that a maximum y axis coordinate of the first bounding box is less than a maximum y axis coordinate of the second bounding box where an origin for a y axis is at a top of the image.

14. The system of claim 11, wherein determining, for an image captured by a camera, a first bounding box that represents a first moving object depicted in the image comprises:
determining a smallest rectangle that both includes all pixels in the image that represent the first moving object as the first bounding box and has a top edge and bottom edge that are parallel to a top edge and bottom edge of the image.

15. The system of claim 11, wherein generating a mask for the first bounding box based on the overlap area comprises:
selecting a predetermined mask; and
generating the mask by removal of the overlap area from the predetermined mask.

16. The system of claim 11, wherein generating a mask for the first bounding box based on the overlap area comprises:
generating the mask from a shape of the first moving object that is not in the overlap area.

17. The system of claim 11, wherein determining, using data from the image that is associated with the mask, that the first moving object matches an appearance of another moving object depicted in another image captured by the camera comprises:
determining that a portion of the another image that corresponds to the mask matches a portion of the image that corresponds to the mask.

18. The system of claim 11, wherein determining that a portion of the another image that corresponds to the mask matches a portion of the image that corresponds to the mask comprises:
determining that a color histogram for the portion of the another image that corresponds to the mask matches a color histogram of the portion of the image that corresponds to the mask.

19. The system of claim 11, wherein determining that the first bounding box and a second bounding box overlap in an overlap area comprises:
determining that the first bounding box and the second bounding box both include the overlap area.

20. A non-transitory computer-readable medium storing software comprising instructions executable by one or more computers which, upon such execution, cause the one or more computers to perform operations comprising:
determining, for an image captured by a camera, a first bounding box that represents a first moving object depicted in the image;
determining that the first bounding box and a second bounding box overlap in an overlap area;
determining that the first moving object represented by the first bounding box was farther from the camera that captured the image than a second moving object represented by the second bounding box;
generating a mask for the first bounding box based on the overlap area; and determining, using data from the image that is associated with the mask, that the first moving object matches an appearance of another moving object depicted in another image captured by the camera.

* * * * *